United States Patent

Forney et al.

[11] 3,981,195
[45] Sept. 21, 1976

[54] SILO LEVEL MEASURING SYSTEM

[75] Inventors: Ross H. Forney, Renner; Candelario Paredes, Dallas, both of Tex.

[73] Assignee: Forney Engineering Company, Carrollton, Tex.

[22] Filed: July 21, 1975

[21] Appl. No.: 597,936

[52] U.S. Cl. .................................................. 73/296
[51] Int. Cl.² ........................................... G01F 23/20
[58] Field of Search ........................................ 73/296

[56] References Cited
UNITED STATES PATENTS
2,380,249  7/1945  Kuehni.................................. 73/296

FOREIGN PATENTS OR APPLICATIONS
937,051  8/1948  France .................................. 73/296
1,358,607  9/1964  France .................................. 73/296

Primary Examiner—Richard C. Queisser
Assistant Examiner—Frederick Shoon
Attorney, Agent, or Firm—Marvin A. Naigur; John E. Wilson

[57] ABSTRACT

A system is provided for measuring the level of bulk material in a silo utilizing load cells responsive for determining total load. The silo is constructed with a separated upper storage portion and lower hopper portion with a flexible connecting seal so that the response of the load cells is independent of the weight of the storage section. The interior surfaces of the silo may be coated with an anti-friction material, such as material sold under the Registered Trademark TEFLON, and the silo surfaces have walls tapering outwardly towards the seal so as to reduce the possibility of bridging and jamming of the stored bulk material.

19 Claims, 2 Drawing Figures

SILO LEVEL MEASURING SYSTEM

BACKGROUND OF THE INVENTION

In automated bulk material handling systems, it is necessary to store products for subsequent conveyance to succeeding stages of the process. In order to efficiently operate such systems, it is necessary to have an accurate measurement of the material in storage at any particular time.

Measurements of the level or load of bulk material in a silo of conventional design has presented many problems to the designer of the automated silo filling systems. These measurements are usually accomplished by inference. For example, the instantaneous level of a silo is considered to be a function of the length of time during which the silo is emptied at a presumed constant rate of discharge. In order to assure than an overload condition does not occur, large error margins must be considered thereby reducing the efficiency of the filling process.

Another method of measuring silo level is to use an ultrasonic probe, and electronic detector apparatus which measures the time differential between transmission and reception of an ultrasonic burst, which can readily be converted into a silo level figure.

Since bulk materials do not flow in a uniform manner, problems exist which create large error factors in the systems mentioned above. Rat holing and bridging are two effects caused by uneven flow characteristics of the bulk materials causing uneven distribution of the stored material. Large voids caused by uneven flow within the silo can provide a rather erroneous picture as to the actual level or volume of material actually stored.

Yet another method of measuring the load in a silo involves the use of load cells, wherein the entire silo is carried by support members having a load cell at each support. The cells provide a weight signal output which is directly related to the level of the silo. There are difficulties associated with this scheme because of the effects of electrical noice as explained below. Further, since the entire silo plus contents must be supported by the cells, lateral forces on the silo and transient noise caused thereby diminish the accuracy of the measurement.

The system of the present invention is designed to obviate many of the effects encountered in the prior art in respect to the measurement of levels of bulk material as shall be pointed out in the following description.

SUMMARY OF THE INVENTION

There has been provided a system for measuring the level of stored bulk material comprising an upper silo storage compartment and fixed support therefor. A lower marginal edge of the silo storage compartment is positioned above a separate lower hopper section with an intermediate flexible seal such that the hopper is free to move axially with regard to the bulk material within storage portion of the silo and hopper but is unaffected by the weight of the silo itself. Load cells attached to supports for the hopper are responsive to measure the load such that the load cell response is a function of the sum of the weight of the stored material and hopper absent a consideration of the weight of the storage compartment.

The interior surfaces of the silo are coated with an anti-friction material such as material sold under the Registered Trademark TEFLON.

In another embodiment of the invention, the walls of the silo storage compartment may be tapered outwardly toward the seal to reduce the possibility of jamming.

DESCRIPTION OF THE DRAWINGS

For a better understanding of the present invention together with other and further objects thereof, reference is directed to the following description taken in connection with the accompanying drawings wherein.

DESCRIPTION OF THE PREFERRED EMBODIMENT

Figure 1:
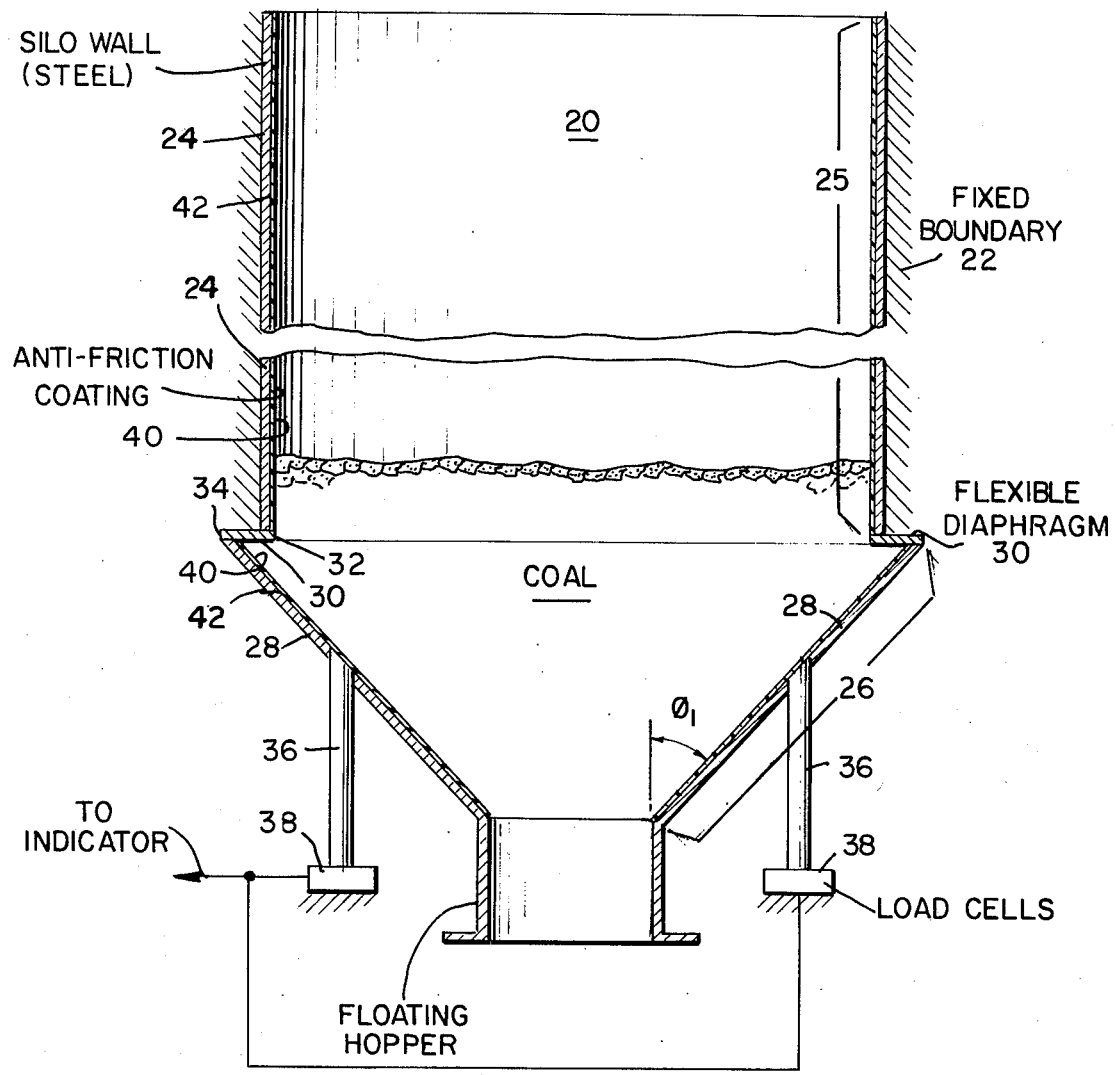
FIG. 1 is an elevational view of a cylindrical silo and measuring system therefor of the present invention, with portions of the silo broken away and shown in section to illustrate the interior portion thereof.

In order to avoid many of the problems associated with load measuring systems, a new design has been provided, as illustrated in FIG. 1, wherein the bulk of the structure of a silo 20 may be supported by a fixed structure shown generally as fixed boundary 22 which may be a concrete wall and associated super structure. The silo 20 includes an upper storage compartment 25 formed with a cylindrical wall 24, which is mounted on an inverted frusto-conical hopper discharge compartment 26. Other methods of supporting the cylindrical wall 24 of silo 20 separately from the hopper section 26 may also be used as required. The hopper section 26 is defined by frusto-conical walls 28 and the angle subtended between frusto-conical wall 28 and the vertical axis of the hopper section 26 is designated $\phi_1$. The angle $\phi_1$ is a function of the angle of repose of the bulk material (e.g. coal) and may be different for each specific material.

A flexible diaphragm 30, extending radially outwardly of wall 24, is attached about a lower marginal edge 32 of the upper cylindrical storage compartment 25. The flexible diaphragm 30 may be shaped in the form of a flat annular ring and is suitably coupled to an upper marginal edge 34 of the hopper section 26. The diaphragm 30 is preferably fabricated from light gauge metal stock having appropriately sized inner and outer radii. The width of annular diaphragm 30 preferably is about 3 inches. Lower support members 36 and load cells 38 carry the weight of the hopper section 26 and stored load independently of the weight of the cylindrical wall 24.

In the particular embodiment of FIG. 1, the hopper section 26 has a larger diameter at upper marginal edge 34 than lower marginal edge 32 of wall 24. This eliminates interior obstruction to the stored material. Since bulk materials have a tendency to brigde and jam in the silo 20, any obstruction which could encourage a jamming effect should be avoided.

An advantage of the present invention is that the structural weight of the upper storage compartment 24 of silo 20 is segregated from the load of the stored material. Further, side loading, due to the lateral forces on the wall 24, is virtually eliminated because the cylindrical wall 24 is supported independently of the load cells 38 and supports 36.

Since the weight of the bulk material in the silo 20 is the subject load to be measured, independent of a major portion of the structure of silo 20, a more accurate measurement may be made of the containments in silo 20. For example, assume a 100 ton load of coal fills the silo 20. If the hopper section 26 weighs one ton, the weight of the load of material (100 tons) to be weighed would be significantly higher than the weight of hopper section 26 (i.e., the one ton weight of hopper section 26 virtually may be ignored). On the other hand, assuming a 90 ton structural weight of the cylindrical wall 22, if the weight of the entire silo 20 and load material were to be supported by load cells 38, the total load would be 190 tons. The weight of the silo structure whether full or empty could not be ignored. By segregating the upper storage area 25 defined by cylindrical wall 22, from the stored material, the most significant measurement is the coal loading.

In the prior art, the best measurement of load would occur upon full loading of the silo, and this is diminished progressively as the load emptied. In the present invention, the best load figure remains significant even as the hopper section 26 is emptied of its contents.

It is clear then that the system of the present invention provides a much more accurate indication of the actual load since variations in the output load cells 38 would be heavily weighed in terms of the actual load as opposed to the weight of cylindrical wall 24.

Another very clear advantage of the present invention is that the total weight supported by the load cells 38 is significantly reduced because the weight of the walls 24 is independently supported. Further, with reduced weight, the load cells 38 required for the measurement are smaller and correspondingly reduced in cost.

The floating hopper concept as illustrated in FIG. 1 virtually eliminates any lateral stress on the load cells 38 because the fixed cylindrical wall 24 supports the material laterally above the level of diaphragm 30, while the hopper section 26 and supports 36 carry the material below. The load carried in silo 20 is more stable and the diaphragm 30, while flexible in the vertical direction, is virtually fixed with respect to the horizontal direction.

If lateral forces do exist in the silo 20, their effect is substantially reduced because the weight of the hopper section 26 and the load of the contents are reduced as compared to a free standing silo.

Conventional means for shaking the load within the silo 20 may be accomplished with less chance of noise contamination of the output of load cells 38. Shaking or dithering frequency can be filtered with a much better signal to noise ratio.

It should be understood that, in the preferred embodiment, the diaphragm 30 is in the form of a light gauge metal ring suitably attached to cylindrical wall 22 and hopper section 26 at lower edge 32 and upper edge 34 respectively. The diaphragm 30 is advantageous, since it is strong yet flexible and closes the vessel, thus preventing dust from contaminating the surrounding area. Other closures for diaphragm 30 would also be effective, such as a heavy canvas cover or a labyrinth seal.

The provision of the diaphragm 30 is preferred because of the closure integrity and because it provides a virtually frictionless means of separating the hopper section 26 from cylindrical wall 24. An open annular space, in place of the diaphragm 30, also is virtually frictionless but is less desirable. It should be understood, however, that an open annular space in place of the diaphragm 30 is within the principle of the present invention. These variations which are not illustrated in the drawing are possible modifications which are contemplated and recited herein for purposes of illustration of the versatility of the present invention.

Figure 2:
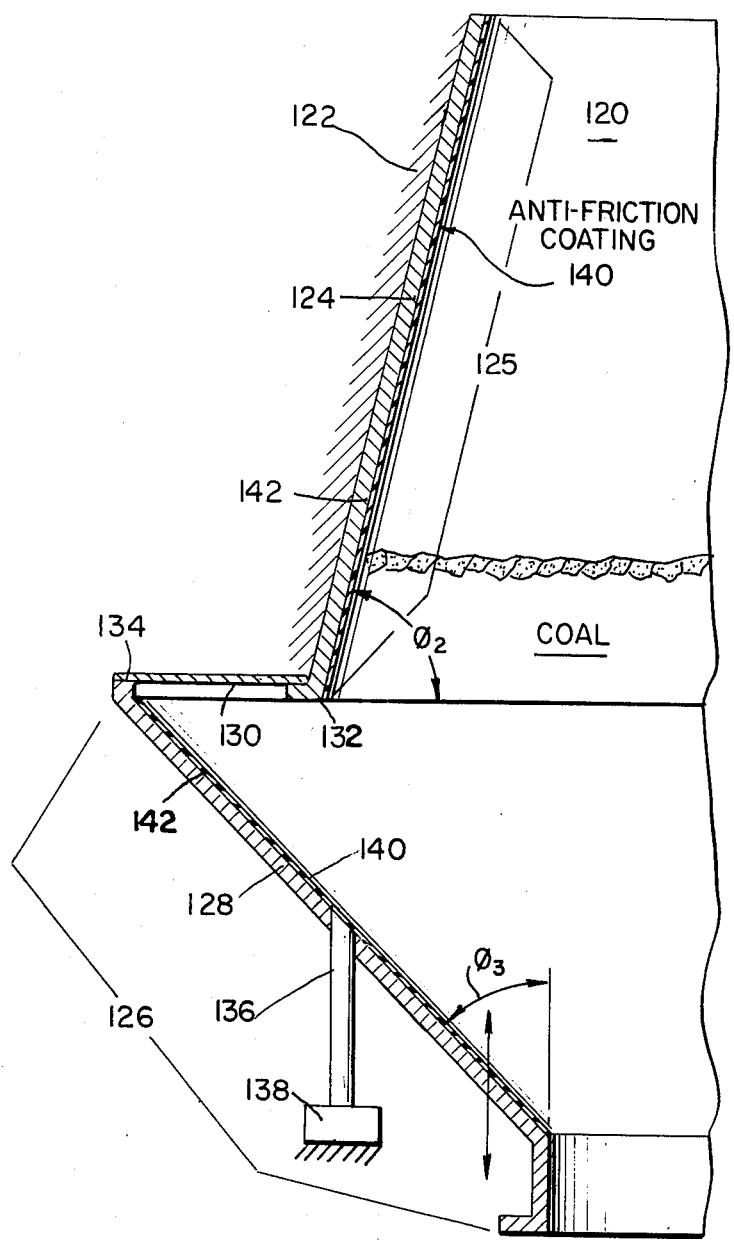
FIG. 2 is a sectional view of a portion of a tapered silo and measuring system therefor in another embodiment of the present invention.

In FIG. 2 there is shown a further embodiment of the invention in which similar corresponding parts have been designated by the same reference numeral as part of a "100" series. The bulk of the structure of a silo 120 may be supported as in FIG. 1 by a fixed structure shown generally as fixed boundary 122 which as in FIG. 1, may be a concrete wall and associated super structure. The silo 120 is formed with a conical upper storage compartment 125 with wall 124 having the shape of a truncated cone extending outwardly towards a diaphragm 130 at an acute angle $\phi_2$ measured from the horizontal. The upper conical storage compartment is mounted on an inverted frusto-conical hopper section 126. Other methods of supporting the conical wall 124 of silo 120 separately from the hopper section 126 may also be used as required. The hopper section 126 is defined by frusto-conical wall 128 and the angle subtended between the frusto-conical wall 128 and the vertical axis of the hopper section 126 is designated $\phi_3$. The angle $\phi_3$ is a function of the angle of repose of the bulk material and may be different for each specific material.

Flexible diaphragm 130, extending radially outwardly of the storage compartment 125 is attached about a lower marginal edge 132 of the upper conical wall 124 of the silo 120. The flexible diaphragm 130 may be shaped in the form of a flat annular ring and is suitably coupled to the upper marginal edge 134 of the hopper section 126. The diaphragm 130 is preferably fabricated from light gauge metal stock having appropriately sized inner and outer radii. The width of annular diaphragm 130 preferably is about 3 inches. Lower support members 136 and load cells 138 carry the weight of the hopper section 126 and stored load independently of the weight of the concial wall 124. In the particular embodiment of FIG. 2, the hopper section 126 has a larger diameter at upper marginal edge 134 than lower marginal edge 132 of wall 124.

The purpose of the conical shape of wall 124 is to further reduce the possibility of bridging or jamming of materials in the silo 120. The angle $\phi_2$ may vary depending on the angle of repose of the stored material.

In FIGS. 1 and 2 there is illustrated the utilization of an anti-friction coating referenced at 40 and 140 respectively in the figures. The coating may be synthetic resin polymer such as material sold under the Registered Trademake TEFLON. The respective inner surfaces 42 and 142 of silos 20 and 120 are coated in order to further reduce the possibility of bridging or jamming of the bulk material, thus substantially improving the reliability of level measurements.

There has therefore been provided a system for storing and measuring the bulk material within a silo by the development of a new type of silo structure with a floating hopper and specially coated walls which virtually eliminates the deleterious effects experienced in conventional systems.

While there has been described what at present are considered to be the preferred embodiments of the present invention, it should be obvious to those skilled in the art that various changes and modifications may be made therein without departing from the invention, and it is intended in the appended claims to cover all such changes and modifications that fall within the true spirit and scope of the invention. What is claimed is:

1. A system for measuring levels of bulk material in a silo comprising: an upper storage compartment, means for supporting said upper storage compartment, a lower hopper discharge compartment connected to said upper storage compartment, said upper storage compartment and said hopper discharge compartment selectively formed with marginal edges which are spaced apart and operatively engage each other, such that said hopper discharge compartment supports the load of said bulk material without being effected by the weight of said upper storage compartment, and means responsively coupled to said hopper discharge compartment for measuring the load thereof.

2. The system according to claim 1 wherein the upper storage compartment and hopper discharge compartment respectively comprise: a vertical right regular cylindrical vessel open at each end and an inverted frusto-conical vessel with an open upper end and lower discharge end, the marginal edges of the respective upper storage compartment and lower discharge hopper include the lower open end of the cylindrical vessel, fitted within and spaced apart from the upper open end of the frusto-conical vessel forming an annular space therebetween.

3. The system according to claim 2 wherein the frusto-conical vessel forming the hopper discharge compartment includes: walls angled outwardly measured vertically from the lower discharge end at an acute angle.

4. The system according to claim 3 wherein the angle subtended between said walls and the vertical axis of said frusto-conical vessel is substantially equal to the angel of repose of the full load of said bulk material capable of being contained in said lower hopper discharge compartment to facilitate the discharge of said bulk material therefrom.

5. The system according to claim 4 wherein the flexible diaphragm comprises: an annular member attached at the respective marginal edges of the upper storage compartment and hopper discharge compartment extending radially outwardly between the marginal edges of said compartments.

6. The system according to claim 5 wherein the annular ring is about three inches wide and fabricated from a light gauge material.

7. The system according to claim 2 further comprising: a flexible diaphragm coupled between the marginal edges of the upper storage compartment and hopper discharge compartment across said annular space providing a vitrually frictionless closure for the system.

8. The system according to claim 7 wherein the flexible diaphragm is a fabric cover engaging with the respective marginal edges of the upper storage compartment and hopper discharge compartment.

9. The system according to claim 1 wherein a labyrinth seal couples the respective marginal edges of the upper storage compartment and hopper discharge compartment.

10. The system according to claim 1 wherein the support means comprise: support members attached to the hopper for carrying the combined load of bulk material and the hopper discharge compartment, the means for measuring the load being responsively attached to said support members so as to provide output signals indicative of said combined load.

11. The system according to claim 1 wherein the upper storage compartment and hopper discharge compartment respectively comprise: a vertical frusto-conical vessel with open ends having a larger lower diameter and an inverted frusto-conical vessel with an open upper end and lower discharge end, the marginal edges of the respective upper and lower compartments comprise the lower open end of the upper compartment engaging in and spaced apart from the upper end of the hopper discharge compartment forming an annular space therebetween.

12. The system according to claim 11 wherein the upper storage compartment is formed with walls angled outwardly measured from the horizontal at the upper end thereof.

13. The system according to claim 12 wherein the angle subtended between said walls and the vertical axis of said upper storage compartment is substantially equal to the angle of repose of the full load of said bulk material capable of being contained in said upper storage compartment to reduce jamming of the bulk material in said upper storage compartment.

14. The system according to claim 11 wherein the hopper discharge compartment is formed with walls angled outwardly measured from the vertical at the lower discharge end at an acute angle.

15. The system according to claim 14 wherein the angle subtended between the walls and the vertical axis of said frusto-conical vessel is substantially equal to the angle of repose of the full load of bulk material capable of being contained in the hopper discharge compartment to facilitate the discharge of the bulk material therefrom.

16. The system according to claim 1 further comprising an anti-friction coating disposed over interior surfaces of the walls forming the upper storage compartment and hopper discharge compartment.

17. The system according to claim 16 wherein the anti-friction coating is a synthetic resin polymer.

18. A system for measuring levels of bulk material in a silo comprising: vertical right regular cylindrical vessel open at each end forming an upper storage compartment, means for supporting the upper storage compartment, an inverted frusto-conical vessel with an open upper end and a lower discharge end forming a lower hopper discharge compartment connected to said upper storage compartment, said upper storage compartment and said hopper discharge compartment selectively formed with respective marginal edges at the lower end of the storage compartment and upper end of the hopper discharge compartment, the marginal edges being spaced apart and operatively engaging each other with the marginal edge of the hopper discharge compartment surrounding the marginal edge of the storage compartment, a closure for the silo connecting the marginal edges, means for supporting the hopper separately from the storage compartment, such that said hopper discharge compartment supports the load of said bulk material without being affected by the weight of the upper storage compartment and means responsively coupled to the hopper discharge compartment for measuring the load thereof.

19. A system for measuring levels of bulk material in a silo comprising: vertical right regular frusto-conical vessel open at each end formimg an upper storage compartment, means for supporting the upper storage compartment, an inverted frusto-conical vessel with an open upper end and a lower discharge end forming a lower hopper discharge compartment connected to said upper storage compartment, said upper storage compartment and said hopper discharge compartment selectively formed with respective marginal edges at the lower end of the storage compartment and upper end of the hopper discharge compartment, the marginal edges being spaced apart and operatively engaging each other with the marginal edge of the hopper discharge compartment surrounding the marginal edge of the storage compartment, a closure for the silo connecting the marginal edges, means for supporting the hopper separately from the storage compartment, such that said hopper discharge compartment supports the load of said bulk material without being affected by the weight of the upper storage compartment and means responsively coupled to the hopper discharge compartment for measuring the load thereof.

* * * * *